Dec. 6, 1955  H. WEBER  2,725,596
EXTRUDER
Filed Jan. 29, 1953
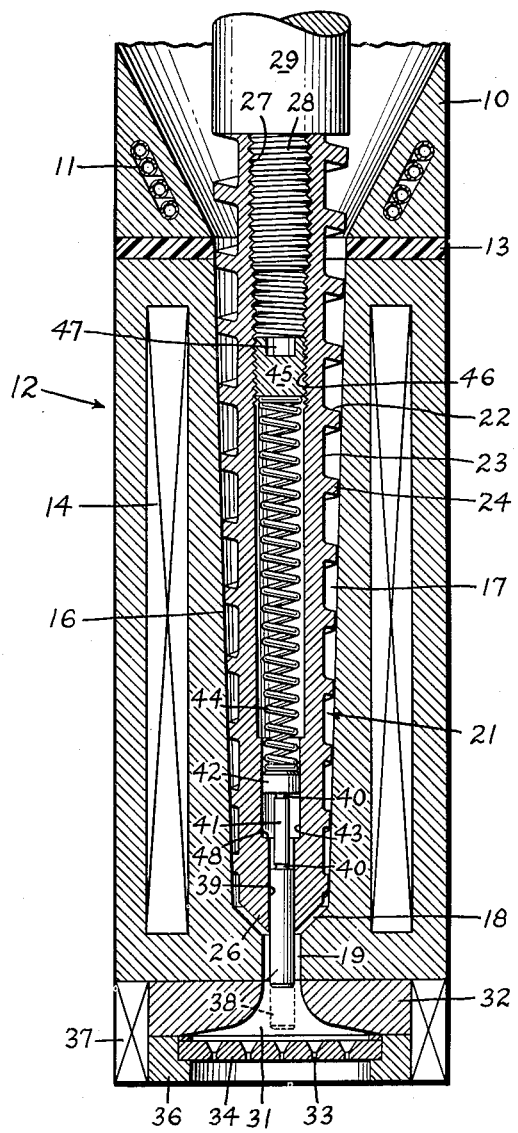
INVENTOR.
HAROLD WEBER
BY
ATTORNEYS.

United States Patent Office 2,725,596
Patented Dec. 6, 1955

2,725,596

EXTRUDER

Harold Weber, Bloomfield, N. J., assignor to Celanese Corporation of America, New York, N. Y., a corporation of Delaware Application January 29, 1953, Serial No. 333,910

7 Claims. (Cl. 18—8)

This invention relates to extrusion of thermoplastic materials and relates more particularly to the melt-spinning of filament-forming thermoplastic materials.

In the extrusion of thermoplastic materials it is customary to feed a comminuted thermoplastic material, which may be in the form of a flake, granule or powder, into a heated jacket or cylinder fitted with a screw conveyor which forces the material through the cylinder. As the thermoplastic material is moved forward and compressed and densified by action of the screw conveyor, it is progressively heated to a molten or highly plastic state. When the molten or plastic material leaves the screw conveyor, it may be passed over a torpedo which acts to spread the material in the form of a thin film in close contact with the heated cylinder wall to facilitate uniform heating. The molten or plastic material, which is under pressure due to the action of the screw conveyor, then passes through a shaping die.

When this conventional method of extrusion is applied to a melt-spinning operation, in which a molten filament-forming thermoplastic material is extruded in filamentary form through a spinnerette, it is found that it is difficult to obtain uniform filaments. This difficulty appears to be due to variations in the pressure of the molten material at the spinnerette due to variations in the rate at which the screw conveyor moves the material through the heated cylinder. At times the filament-forming material may become temporarily jammed between the screw and the cylinder wall, or the screw conveyor may effect non-uniform compression of the material. This variation in the rate in which the material is conveyed by the screw is often as high as 30% with standard extrusion screws. By tapering the extrusion screw and cylinder, this variation is reduced appreciably, but the uniformity of the resulting filaments is still not as high as desired.

It is therefore an object of this invention to provide a novel apparatus for melt-spinning which will be free of the foregoing and other disadvantages.

A further object of this invention is the provision of a new and improved melt-spinning extrusion apparatus wherein variation in the movement of material therethrough is substantially eliminated and substantially uniform filaments are produced.

Other objects of this invention will be apparent from the following detailed description and claims.

The extrusion apparatus of this invention comprises a chamber, a rotatable screw for conveying thermoplastic material and for delivering said material to the chamber under pressure, means for heating said thermoplastic material being conveyed by the screw, and movable means, responsive to the pressure of the material in the chamber, for varying the volume of the chamber.

More particularly, the melt-spinning apparatus of this invention includes a heated jacket and a conveying screw mounted therein. Comminuted filament-forming thermoplastic material is supplied at one end of the screw and is compressed and carried forward in intimate contact with the inside walls of the heated jacket by the action of the screw. After leaving the screw the material, which is now in a molten condition and under pressure, passes into a chamber and is extruded in filamentary form through a spinnerette located at the base of said chamber. The resulting hot filaments are then cooled and taken up in a conventional manner.

According to this invention, the conveying screw is hollow and is provided at its delivery end with a tightly fitting slidably mounted torpedo pin which projects partially into the chamber in axial alignment with the screw. A spring is also mounted in the bore of the screw in such a manner that one end of the spring engages the head of the torpedo pin and the other end of the spring engages a threaded plug adjustably mounted within the screw. Thus, the torpedo pin is urged by the spring in the direction of the chamber. The screw and pin are provided with abutment means for limiting this outward movement of the pin.

In the operation of the apparatus of this invention, the torpedo pin is forced back partially into the screw against the action of the spring by the normal pressure of the thermoplastic material in the chamber. When there is a temporary decrease in the rate at which the filament-forming material is fed to the chamber, there is a decrease in the spinning pressure, that is, in the pressure of the material in the chamber. Because of this decreased pressure, the torpedo pin is forced out into the chamber by the action of the spring, thus maintaining, to a large extent, the pressure in the chamber and overcoming any tendency for the formation of voids in the chamber. When the feed rate is increased to its normal value and the pressure in the chamber builds up, the torpedo pin is forced back to its original position. By maintaining the pressure in the chamber at a substantially constant value and preventing the formation of voids, the apparatus of this invention makes it possible to spin much more uniform filaments.

In the accompanying drawing, which illustrates certain preferred embodiments of this invention, the figure is an elevational view, in section, of a melt spinning apparatus.

In the drawing reference numeral 10 designates an annular tapered feed hopper, which is adapted to be cooled by any suitable means, such as by cooling means circulating through a cooling coil 11 in said hopper, and which is separated from a jacket or cylinder block 12 by insulation 13. Cylinder block 12 is maintained at an elevated temperature by means of a heat-transfer element 14, which may be an electric heater or, more desirably, a circulating stream of a hot heat-transfer fluid. Inner walls 16 of the cylinder block 12 define an upper frusto-conical passageway 17, a lower frusto-conical passageway 18 and a cylindrical aperture 19. Mounted within the passageways 17 and 18 is a conveying screw 21. The construction of this screw 21 is such that its threads 22 are formed on a cylindrical body 23, the outer surfaces 24 of the threads 22 being tapered to fit closely against the inner walls of the passageway 17 of the block 12. The lower tip 26 of the screw 21 is frusto-conical in shape and is adapted to define a restricted channel between this lower tip 26 and the inner walls of the lower passageway 18 of the block 12. Screw 21 is hollow and is provided at its upper end with an internally threaded portion 27 adapted to be engaged by a nipple 28 mounted at the end of a drive shaft 29, the rotation of which drives the screw 21.

Comminuted filament-forming thermoplastic material is fed into the feed block 10 around the screw 21 and is carried down and compressed in intimate contact with the heated walls 16 of the block 12 by the rotation of said screw. Due to the fact that these inner walls 16 are tapered while the body 23 of the screw is cylindrical, the thermoplastic material is compressed and densified to a considerable extent. Desirably the screw 21 is so proportioned that the ratio of the volume of material moved by the upper end of said screw into the block 12 to the volume of material moved by the lower end of the screw, for each revolution of the screw, is equal to the ratio of the absolute density of the solid thermoplastic material to the bulk density, or apparent density, of said material in the comminuted form. The heat supplied by the element 14 is of a temperature sufficient to melt the thermoplastic material. The molten thermoplastic material under pressure emerges from the aperture 19, at the bottom of the block 12, into a chamber 31 formed in an adapter ring 32. Ring 32 is mounted at the lower end of block 12 and is secured thereto by any suitable means. The molten material under pressure then passes through the apertures 33 of a spinnerette 34 which is held at the bottom of adapter ring 32 by means of a retaining ring 36, which may be secured to the adapter ring 32 by any suitable means such as screws (not shown). Spinnerette 34 may be provided with suitable filtering screens and sand packs (not shown) in a manner well known in the art. To make sure that the thermoplastic material is maintained in the molten state, it is desirable to supply heat to the rings 32 and 36, as by means of a band heater 37.

Screw 21 is provided at its lower end with a cylindrical torpedo pin 38 which is axially mounted for sliding movement in bore 39 in said screw. Pin 38 and bore 39 are lapped so that their fit is close enough to be air-tight even at a pressure of 100 pounds per square inch gauge. Pin 38 is provided with circumferential grooves 40, for the reception of a suitable lubricant capable of withstanding high temperatures, and with a portion 41 of slightly decreased diameter between said grooves. Pin 38 is also provided with an enlarged head 42 slidably fitted in an enlarged bore 43 of screw 21. Abutting against the head 42 is a helical compression spring 44, the upper end of which abuts against an adjustable threaded plug 45, mounted in an internally threaded portion 46 of the screw 21 and provided with a slot 47 adapted to receive an adjusting tool such as a screw driver. The slot 47 may be reached for adjustment of the position of plug 45 by unscrewing the nipple 28 of drive shaft 29 from the end of screw 21. The spring 44 urges the pin 38 downwardly towards the position shown in dotted lines in the drawing, further downward movement of the pin being restrained by the engagement of its head 42 with a shoulder 48 of screw 21. Spring 44 desirably has a relatively low modulus, or slow rate, so that a relatively small change in force is required to move the pin between the two positions shown in the drawing.

The initial loading of the spring 44 is so adjusted, by movement of the plug 45, that the pressure of the thermoplastic material in the chamber 31 during normal operation forces the pin 38 upwardly to the position shown in solid lines in the drawing. In this position the pin 38 serves to maintain the thermoplastic material, coming from the screw, in a thin film in contact with the walls of the heating barrel 12. If the flow of material from the screw slackens due to temporary jamming or severe densification of the thermoplastic material, the resulting decrease in the pressure in chamber 31 allows the pin to be urged downwardly into the chamber 31, thus maintaining, to a large extent, the pressure in the chamber 31 and overcoming any tendency for the formation of voids in the chamber. When the rate is increased to its normal value and the pressure in chamber 31 builds up, the torpedo pin is forced back to its original position. If there is any undesired temporary further increase in the flow of material from the screw, the resulting increased spinning pressure forces the pin to a point above the position shown in solid lines in the drawing, thus partially mitigating the effects of this increased rate of flow.

It is to be understood that the foregoing detailed description is given merely by way of illustration and that many variations may be made therein without departing from the spirit of my invention.

Having described my invention, what I desire to secure by Letters Patent is:

1. In an extruder for thermoplastic material, a chamber, a heated jacket communicating therewith, a rotatable screw for conveying thermoplastic material through said jacket and to said chamber under pressure, and means for improving the uniformity of the pressure of the thermoplastic material within said chamber comprising means supported by said screw and relatively movable with respect thereto and extending into said chamber that responds to an increase in pressure in said chamber by moving out of the chamber to increase the effective volume of the chamber and thereby reduce the pressure therein, and that responds to a decrease in pressure in said chamber by moving into the chamber to reduce the effective volume of the chamber and thereby increase the pressure therein.

2. An extruder as in claim 1 including resilient means for urging the movable means into the chamber.

3. An extruder as in claim 1 wherein the movable means comprises a torpedo pin past which the thermoplastic material flows into said chamber.

4. An extruder as in claim 3 including a spring for urging the torpedo pin into the chamber.

5. An extruder as in claim 4 including means for adjusting the compression in said spring.

6. An extruder as in claim 5 including a spinnerette connected with said chamber through which the material being extruded emerges.

7. An extruder as in claim 1 including a spinnerette connected with said chamber through which the material being extruded emerges.

References Cited in the file of this patent

UNITED STATES PATENTS

| 2,295,942 | Fields | Sept. 15, 1942 |
| 2,471,813 | Cousino | May 31, 1949 |